T. G. & V. H. VAN SANT.
GEARING.
APPLICATION FILED SEPT. 11, 1916.
1,229,548.
Patented June 12, 1917.
3 SHEETS—SHEET 3.
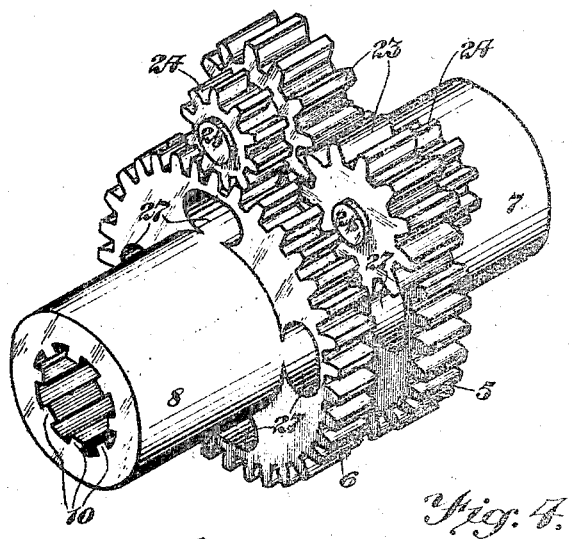
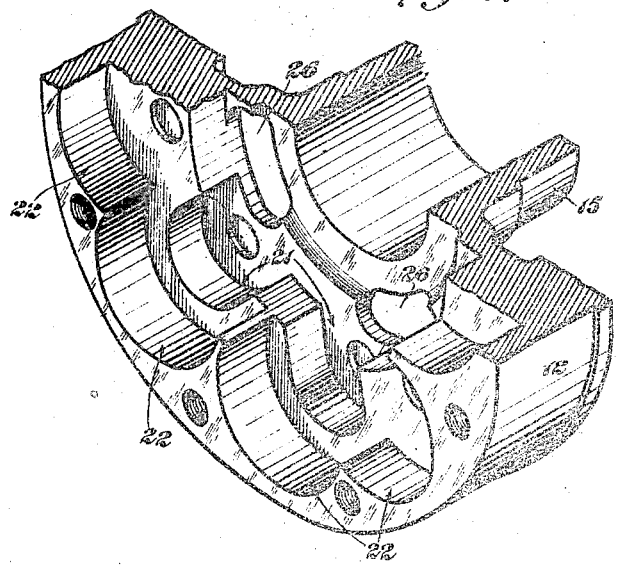
WITNESS.
Charles A. Becker.
INVENTORS:
THOMAS G. VAN SANT,
VICTOR H. VAN SANT,
BY
Rippey & Kingsland
THEIR ATTORNEYS.

UNITED STATES PATENT OFFICE.

THOMAS G. VAN SANT, OF POPLAR BLUFF, AND VICTOR H. VAN SANT, OF ST. LOUIS, MISSOURI.

GEARING.

1,229,548.

Specification of Letters Patent. Patented June 12, 1917.

Application filed September 11, 1916. Serial No. 119,340.

*To all whom it may concern:*

Be it known that we, THOMAS G. VAN SANT and VICTOR H. VAN SANT, citizens of the United States, and residents of the city of Poplar Bluff, Butler county, Missouri, and St. Louis, Missouri, respectively, have invented a new and useful Gearing, of which the following is a specification.

This invention relates to differential gearing for automobiles.

An object of the invention is to provide a differential gearing for automobiles comprising series of pinions operating in a quantity of oil or grease in the differential housing on the principle of the impeller pinions of a rotary pump, the pinions of each series intermeshing with each other and with the gears upon the axle shafts respectively, and provision for enabling differential operations of the pinions of the different series as required to drive both rear wheels of the automobile at the proper speed in making turns, and also under any conditions when there is a difference in traction as between the rear wheels; as for instance, when either of the rear wheels has traction upon a firm surface and the other upon soft ground or in mud, so that the wheel in the soft ground or mud will not spin, but by coöperation of the differential pinions with the oil or grease in the differential housing the wheel upon the firm surface will also be driven.

Another object of the invention is to provide a gearing of the class described comprising differential pinions entrained with the rear axle shafts respectively, means for driving the differential pinions from the drive shaft of the automobile, and means for coöperating the pinions with a quantity of oil or grease in the differential housing to prevent the idling of either of the rear axle shafts when the traction is released or reduced on either one or the other of the rear wheels; by which construction proper differential operation is permitted, but the spinning of either of the rear wheels while the other remains stationary is positively prevented.

A further object of the invention is to provide a gearing whereby the power on both of the rear axle shafts is equalized in order to prevent skidding of either of the rear wheels.

In addition to the foregoing objects other objects of and advantages to be attained by the invention will appear from the following description in which reference is made to the accompanying drawings, wherein—

Fig. 3 is a perspective view of the axle gears and one set of the differential pinions illustrating the novel construction of the latter.

Fig. 4 is a fragmentary perspective view of a portion of the differential pinion support.

Figure 1:
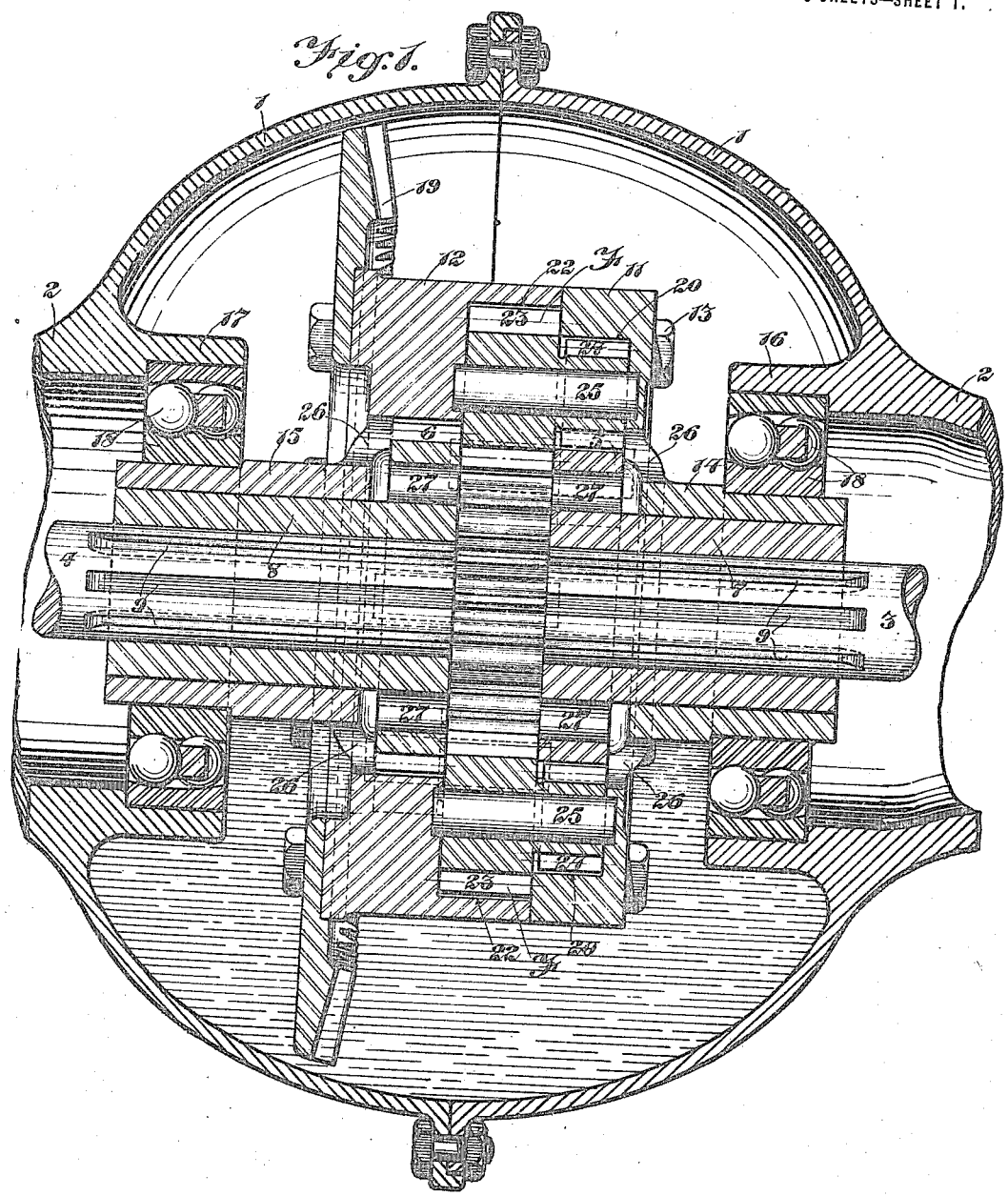
Figure 1 is a vertical section of the improved differential gearing mechanism.

As illustrated in the drawings, the differential mechanism is incased in a housing 1 of familiar design and construction in connection with the tubular housings 2 of the axle shafts. Portions of the axle shafts are illustrated in Fig. 1 and are designated by 3 and 4, respectively. These shafts are axially alined and their inner ends are spaced apart and support the gears 5 and 6. The gear 5 has a hub 7 and the gear 6 has a hub 8, and these hubs are feathered or splined on the axle shafts. The specific construction illustrated for attaching the gears to the shafts comprises a series of grooves 9 adjacent to the ends of the shafts receiving tongues 10 formed within the hubs 7 and 8 of the gears. Of course, any other preferred or efficient connecting devices may be employed instead of the specific splining connection illustrated, and we do not restrict ourselves to this identical form of connection.

The differential pinions mesh with the gears 5 and 6, respectively, and are carried in a support comprising two members 11 and 12 which are connected together and to the large bevel driving gear by bolts 13. The member 11 has a laterally extending hub 14 embracing the hub 7 of the gear 5, and the member 12 has a similar hub 15 embracing the hub 8 of the gear 6. The hubs 14 and 15 are journaled in anti-friction bearings 18 mounted in appropriate supporting parts 16 and 17 in connection with the housing 1. The entire pinion support is driven by the main drive shaft of the automobile, it being understood that the usual driving pinion on the drive shaft meshes with the large bevel drive gear 19 which is held in connection with the differential pinion support by the bolts 13, as stated.

The differential pinion support, comprising the members 11 and 12, is of peculiar and novel construction. The member 11 is formed with a recess which receives the gear 5 and is also formed with a series of pairs of segmental or concave recesses 20 outwardly from the periphery of the gear 5. The member 12 is also formed with a recess which receives the gear 6 and with a like series of pairs of recesses 21 outwardly from the periphery of the gear 6, similar to the recesses 20 in the member 11. The member 12 is also formed with a series of pairs of recesses 22 which receive the pump impeller pinions of the differential as hereinafter described. The arrangement of the recesses 21 and 22 in the member 12 is clearly illustrated in Fig. 4, by reference to which it will be seen that the recesses 22 are arranged in pairs so that the walls of each pair of recesses intersect at one side and extend to the inner surface of the member 12, thereby forming alternate pairs of communicating recesses in which the pump impeller pinions are mounted in the manner next described.

The differential mechanism for actuating the axle shafts from the bevel driving gear 19 consists of alternate pairs of differential driving elements comprising for each pair two relatively large pump impeller pinions 23 within the recesses 22 which are concentric with the pinions mounted therein, and small pinion members 24. Each differential element is supported by an axis 25, the ends of which are journaled in appropriate bearings in the members 11 and 12 as illustrated in Fig. 1. It will be observed that the ends of the teeth on the pump impeller pinions 23 are spaced slightly from the concentric walls of the recesses in which said pinions are mounted, thus enabling the oil or grease to be forced slowly into and out of the recesses in order to provide for the differential action of the pinions as required where there is a variation of the traction of the two rear wheels. The pump impeller pinions 23 of each pair intermesh and the small pinion members 24 are arranged on opposite sides of the pinions 23 within the recesses 20 and 21 meshing with the gears 5 and 6.

Figure 2:
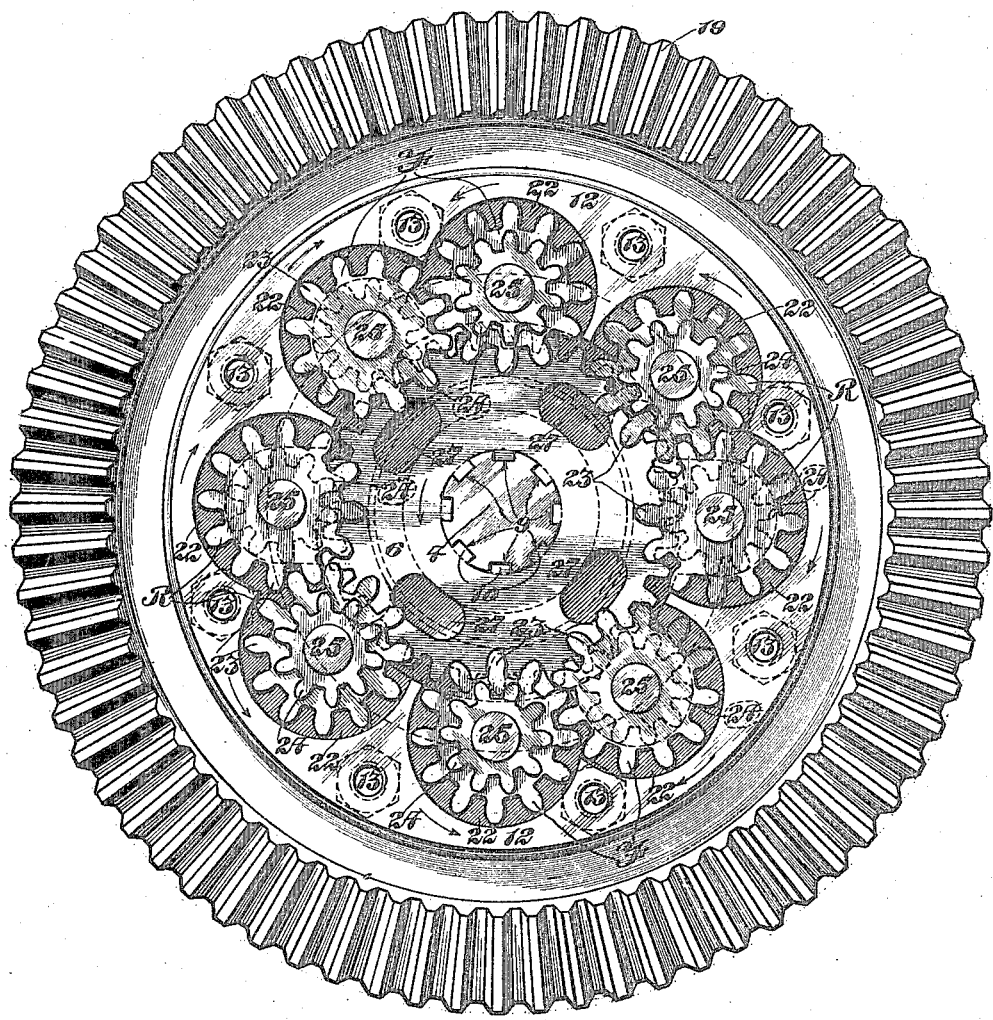
Fig. 2 is an elevation illustrating the large bevel driving gear and the differential pinions including the pump impeller devices which coöperate with the oil or grease to produce the proper differential operation and to prevent the operation or spinning of one of the rear wheels while the other remains stationary.

In the particular embodiment illustrated there are four pairs of differential pinion actuating members and, by reference to Fig. 2, it will be seen that the adjacent pairs of differential elements are oppositely arranged, and that the position of the small pinion members 24 in the adjacent pairs is reversed relatively; that is to say, the pinion member 24 of one actuating element is on the opposite side of the pump impeller pinion 23 from the corresponding pinion member 24 in each adjacent pair of actuating elements. By this construction the diametrically opposite pairs of actuating elements are of the same relative arrangement.

The members 11 and 12 constituting the differential pinion actuating support are provided with passages 26 opening into the recesses 20 and 21, and also communicating with passages 27 through the gears 5 and 6 so that the oil or grease in the housing 1 has free access to the differential mechanism comprising the pump impeller pinions 23 and their associated parts.

In operation the desired quantity of oil or grease is placed in the housing 1 so that when the differential mechanism is in operation, the oil or grease passing through the passages 26 and 27 will enter the space in which the pump impeller pinions are mounted and will also enter the several recesses in which the pump impeller pinions 23 and the smaller pinion members 24 are mounted. The pump impeller pinions operate on the principle of the gears or pinions of a rotary pump, so that when the automobile is traveling in a straight course, where the traction of the rear wheels upon the road is the same, the speed of rotation of the axle shafts and both rear wheels is equal, the pinion support being locked to the axle shafts and driving them with equal speed. The locking engagement of the pinion carrier with the axle shafts results from the tendency of each pair of the pump impeller pinions 23 to rotate in the same direction when there is no variation in traction on the part of the rear wheels. Since equal force is applied to alternate ones of the pinion members in opposite directions, the pump impeller pinions 23 will be held against rotation, thereby causing the axle shafts to rotate with the carrier or support in which the impeller pinions 23 are supported. This locked condition continues until the traction on one or the other of the rear wheels is varied, or until the speed of the rear wheels becomes unequal by reason of changing the direction of travel of the automobile as in making a turn. When the speeds of rotation of the axle shafts become unequal, either by loss of traction on one or the other of the rear wheels, or by reason of variation of speed in making turns, there will be a tendency of the impeller pinions 23 to rotate relatively to compensate for the differential speeds of the axles. That is to say, when the vehicle is to go forward, the pinion 23 in the series indicated by F (Fig. 2) will be impelled or actuated relatively in the direction indicated by the arrows, while the series of pinions indicated by R will be impelled or actuated in the opposite direction, and in the forward drive of the vehicle have no influence toward retarding the differential rotation of the other series, but are brought into effective use when the direction of the drive shaft is reversed. When a variation in the traction of the rear wheels exists or is encountered, a quantity of the oil or grease is compressed within the recesses 22 in which the impeller pinions F are located, so that when the oil or grease is compressed therein further relative rotation of the impeller pinions F is prevented. As a result of this condition and since the axle shaft 3 is entrained with the axle shaft 4 through the medium of the gears 5 and 6, and the differential actuating members, it follows as a necessary consequence that there will be slight, if any, further relative rotation of the axle shaft 3 as compared with the of the axle shaft 4; that is to say, both shafts will then be rotated together, causing the rear wheel, which has traction upon a firm surface, to rotate and move the automobile forwardly until the other rear wheel acquires proper traction and properly performs its function. In the futher travel of the automobile, the oil or grease which had been compressed within the recesses 21 will gradually become equalized, since it may pass from the recesses, between the walls of the recesses and the ends of the adjacent teeth, and the mechanism is thereby automatically restored to a condition for proper differential action.

When the automobile is to be moved backwardly, the differential elements R are brought into function and in case of variation in traction operate to equalize the traction between the rear wheels as in the case of the differential elements F described.

In either case there is sufficient passage for the oil or grease from the recesses to permit the differential action of the rear wheels in making turns, but where either of the rear wheels loses its traction from any cause, the other rear wheel will be positively driven after comparatively slight rotation of the wheel without traction.

We are aware that numerous modifications may be made in the construction shown, without departing from the principles of the invention. We do not restrict ourselves to precise or identical details of construction and arrangement, but what we claim and desire to secure by Letters Patent of the United States, is:—

1. Differential gearing comprising a support having series of recesses therein, series of pairs of pinions in said support, the pinions of each pair meshing within said recesses and operating to compress oil or grease within said recesses, and driving gears driven by said pinions.

2. In a differential gearing, the combination with axially alined shafts and a gear upon each of said shafts, of a pinion support carried by and revoluble relative to said shafts, said support having compression chambers formed therein, sets of intermeshing pinions in said support within said chambers operable to compress oil or lubricant within said chambers, and gears upon said axle shafts entrained with said pinions.

3. In a differential gearing, the combination of a housing arranged to contain oil or grease, axially alined axle shafts extending into said housing, gears upon said axle shafts within the housing, a differential pinion support supported by said axle shafts within the housing, said support having compression chambers formed therein, pump impeller pinions in said pinion support within said chambers, and pinion members in connection with said impeller pinions meshing with said gears, respectively.

4. The combination with axially alined axle shafts, a differential gear housing, and a driving gear within said housing, of a differential pinion support in connection with said driving gear, said support having chambers formed therein, pump impeller pinions carried by said support and operating within said chambers, pinions in connection with said impeller pinions, and gears in connection with the axle shafts meshing with said last-named pinions.

5. Differential gearing for automobiles, comprising a housing arranged to contain oil or grease, a pinion support within said housing, said support having compression chambers formed therein, a driving gear in connection with said pinion support, pairs of pump impeller pinions in said chambers, driving pinion members in connection with said impeller pinions, and gears meshing with said driving pinions for driving the axle shafts of the automobile.

6. The combination with the axle shafts of an automobile and a housing arranged to contain oil or grease, of differential mechanism for differentially driving said axle shafts, comprising gears attached to the axle shafts, a support within said housing, said support having compression chambers formed therein, pump impeller pinions operating in said compression chambers, and pinions in connection with said impeller pinions meshing with said gears.

7. The combination with the axle shafts of an automobile and a housing arranged to contain oil or grease, of differential mechanism for differentially driving the axle shafts, comprising a support within the housing, said support having compression chambers formed therein, pump impeller pinions within said chambers, gears upon the axle shafts, pinions in connection with the impeller pinions meshing with said gears, and a driving gear in connection with said support.

8. The combination with the axle shafts of an automobile, gears attached to said shafts, and a housing incasing said gears and arranged to contain oil or lubricant, of a support within said housing, said support having compression chambers formed therein, passages for admitting the oil or grease from said housing into said compression chambers, pump impeller pinions within said chambers, and driving pinions in connection with said impeller pinions meshing with said gears.

9. The combination with the axle shafts of an automobile, gears attached to said axle shafts, and a housing incasing said gears and arranged to contain oil or grease, of differential mechanism for differentially driving said axle shafts, comprising a support, said support having compression chambers formed therein, a gear for actuating said support, passages for admitting the oil or grease into said compression chambers, and pump impeller pinions in said chambers operative to compress the oil or grease within said chambers, and means for driving said gears and thereby said axle shafts from said impeller pinions.

10. The combination with the axle shafts of an automobile, a gear attached to each of said shafts, and a housing incasing said gears, of mechanism for driving said gears and shafts comprising a support within said housing, said support having compression chambers formed therein, passages for admitting the oil or grease into said support, pairs of pump impeller pinions within said chambers operating to compress the oil or grease therein under conditions described, and pinions entraining said impeller pinions with said gears.

11. The combination with the axle shafts of an automobile, gears attached to said shafts for revolving the same, and a housing incasing said gears and arranged to contain oil or grease, of differential mechanism for driving said gears and shafts comprising a support within the housing, said support having compression chambers formed therein, pinions carried by the support meshing with said gears, and pump impeller pinions in connection with the first-named pinions operating to compress the oil or grease within said compression chambers under the conditions described.

12. The combination with the axle shafts of an automobile, gears attached to said shafts for driving the same, and a housing incasing said gears, of differential mechanism for driving said gears and shafts comprising a support within the housing, said support having compression chambers formed therein, a gear for driving said support, differential pinions carried by said support meshing with said gears, and pump impeller pinions in connection with the differential pinions operating to compress the oil or grease within said chambers under the conditions described.

13. Differential gearing, comprising axially alined driven shafts, a gear carried by each of said shafts, a pinion carrier, sets of intermeshing impeller pinions in said carrier, and a relatively smaller pinion connected with each of the impeller pinions and meshed with said gears, respectively.

14. Differential gearing, comprising axially alined driven shafts, a gear carried by each of said shafts, a pinion carrier, sets of intermeshing impeller pinions in said carrier, a pinion connected with each of said impeller pinions and meshed with said gears, respectively, and means for retarding the rotation of said driving pinions.

15. Differential driving gearing, comprising a housing adapted to contain oil or grease, axially alined shafts extending into said housing, gears on said shafts, a pinion carrier fitted over said shafts, said pinion carrier having compression chambers formed therein, a plurality of sets of intermeshed impeller pinions in said chambers, gear connections between each of the members of said sets with the gears on said shafts, respectively, and passages for admitting the oil or grease into said chambers for retarding relative rotation of said pinions under the conditions described.

16. Differential gearing, comprising axially alined shafts, a driven member, pump impeller pinions arranged to operate in a lubricating substance for locking said driven member with said shafts and for permitting the differential rotation of said shafts, and means for limiting the differential rotation of said shafts.

17. Differential driving gearing, comprising a housing arranged to contain oil or grease, axially alined shafts extending into said housing, a gear attached to each shaft, a pinion carrier having compression chambers therein for receiving pinions, sets of pinions entrained with said gears on said shafts and adapted to compress the oil or grease into said chambers to lock said pinion carrier with the shafts as required to limit the differential rotation of said shafts under the conditions described, and means for admitting the oil or grease to the chambers in said pinion carrier.

18. Differential driving gearing, comprising a housing, driven shafts extending into said housing and arranged in axial alinement, a gear carried by each of said shafts, a revoluble support journaled in said housing, said support having chambers formed therein, differential members comprising large intermeshing pump impeller pinions, and relatively small pinions meshing with said gears, said pinions being arranged in alternate sets, means for admitting oil or grease to said chambers, whereby the rotation of said impeller pinions compresses the same into said chambers under the conditions described, and means for driving said revoluble support.

19. Differential gearing, comprising axially alined shafts, a revoluble support arranged about said shafts, means for rotating said support, gear connections between said shafts and said support arranged to coöperate with a lubricating substance effectively to lock said revoluble member with both of said shafts and to permit the differential rotation of said shafts under the conditions described, and means affecting the operation of said connections to limit the differential rotation of said shafts.

20. Differential gearing, comprising axially alined shafts, a revoluble support arranged about said shafts, means for rotating said support, connections between said shafts and said support operable effectively to lock said support with both of said shafts and to permit the differential rotation of said shafts under the varying conditions described, means affecting the operation of said connections to limit the differential rotation of said shafts when said support is driven in one direction, and separate means affecting the operation of said connections to limit the differential rotation of said shafts when said support is driven in the other direction.

21. Differential gearing, comprising axially alined shafts, a gear on each of said shafts, a support around said shafts, a plurality of pinion elements connecting said support and said gears and arranged to coöperate with a lubricating substance effectively to lock said shafts for rotation with said support and to permit the relative movement of said gears and said driven member under the varying conditions of traction described, and means for limiting the differential movement of said shafts.

22. Differential gearing, comprising an exterior housing, a driven support in said housing having passage ways therethrough, said support having chambers formed therein, sets of intermeshing pump impeller pinions in said support, axially alined shafts, connections between said shafts and each of said sets of impeller pinions, chambers in which said impeller pinions operate, and means for retarding the flow of fluid through said chambers thereby retarding the relative rotation of said pinions in said support.

In witness whereof, we have signed this specification in the presence of two subscribing witnesses.

THOMAS G. VAN SANT.
VICTOR H. VAN SANT.

Witnesses for Thomas G. Van Sant:
 CARL SCHULER,
 WALTER L. KOCH.

Witnesses for Victor H. Van Sant:
 N. G. BUTLER,
 JOHN D. RIPPEY.